April 14, 1959 K. O. SISSON 2,882,360
DOMESTIC APPLIANCE
Filed Feb. 21, 1957
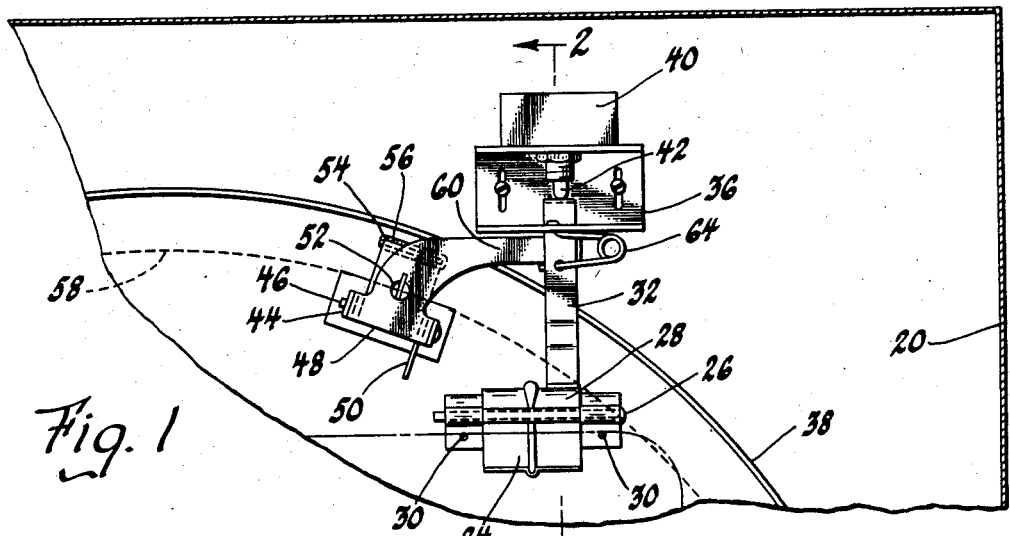
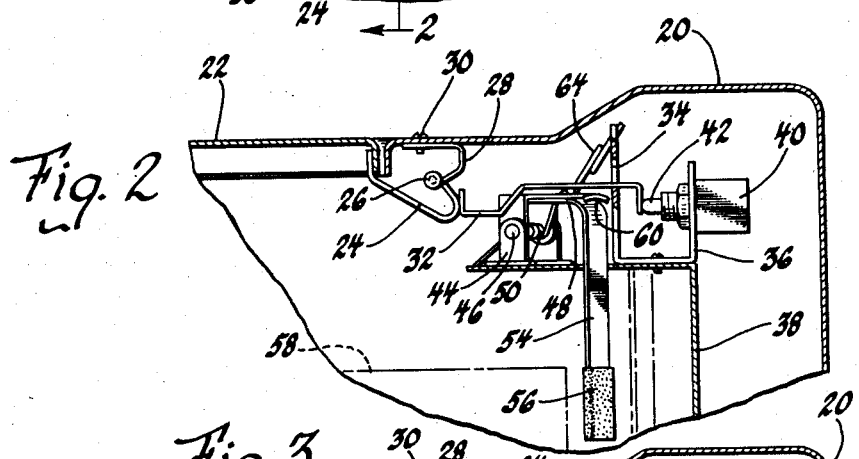
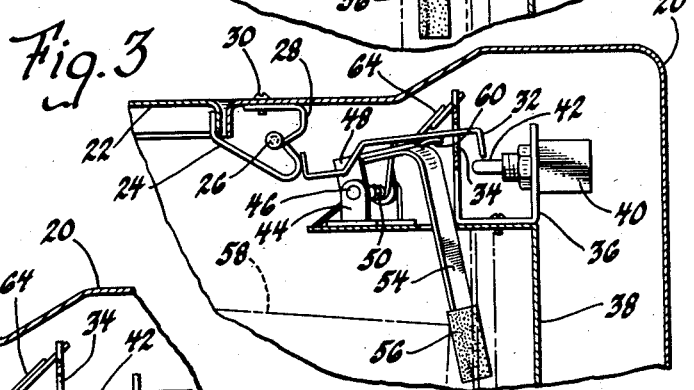
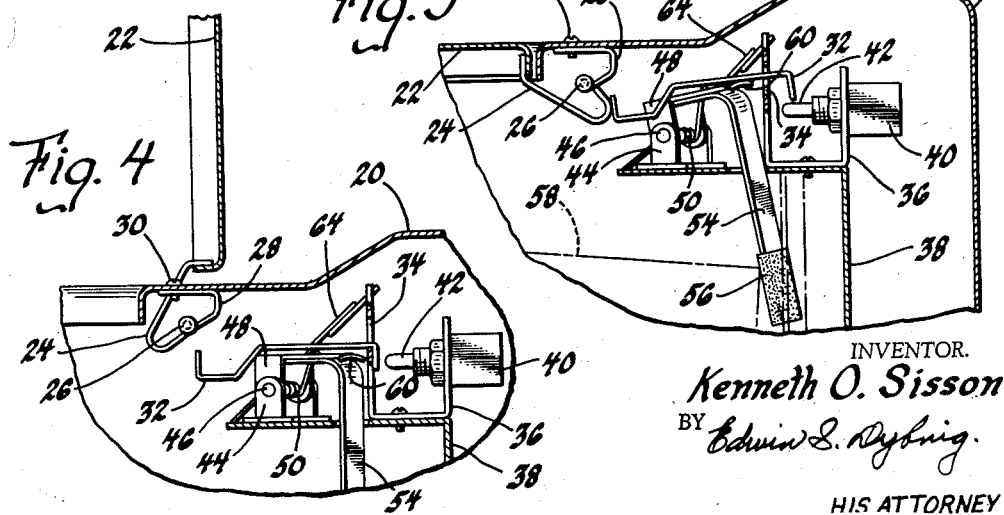
INVENTOR.
Kenneth O. Sisson
BY Edwin S. Dybvig.
HIS ATTORNEY

United States Patent Office 2,882,360
Patented Apr. 14, 1959

2,882,360

DOMESTIC APPLIANCE

Kenneth O. Sisson, Dayton, Ohio, assignor to General Motors Corporation, Detroit, Mich., a corporation of Delaware Application February 21, 1957, Serial No. 641,685

5 Claims. (Cl. 200—61.7)

This invention relates to a domestic appliance and more particularly to stopping and restarting controls for electrically controlled devices and appliances.

Many electrically controlled devices such as automatic dish and clothes washers and centrifugal machines need to change or deenergize the control whenever the lid is opened or some other condition occurs such as excessive unbalance. For simplification of the operation it is desirable to restore the controls to their former operating condition whenever the lid is reclosed.

It is an object of this invention to eliminate separately operated resetting devices and to mechanically open the switch contacts of the control device whenever the lid is open or a predetermined condition such as excessive unbalance occurs in the device control and to reclose such contacts mechanically whenever the lid is reclosed.

It is another object of this invention to provide a simple mechanical arrangement in which the switch contacts are mechanically held closed whenever the lid is closed and which are mechanically opened whenever a predetermined condition occurs in the device or the lid is opened, and which can always be reclosed by simply opening and reclosing the lid.

These and other objects are attained in the form shown in the drawings in which a plunger type switch is held closed by a push-bar by engagement of a part of the lid structure whenever the lid is closed. The opening of the switch can be accomplished by the engagement of a bellcrank lever during excessive unbalance, which moves an integral arm to laterally move the push-bar out of connection with the plunger of the switch. The spring bias of the switch moves the plunger and the switch to the open circuit position to deenergize the device. The push-bar is provided with an inclined spring which, when the lid is opened, causes the push-bar to follow the lid structure and also to move the push-bar back into alignment with the push-button of the switch so that upon reclosing of the lid, the push-bar again depresses the push-button to reclose the switch.

Further objects and advantages of the present invention will be apparent from the following description, reference being had to the accompanying drawings, wherein a preferred form of the present invention is clearly shown.

In the drawings:

Figure 1 is a top view, partly diagrammatic, of a portion of an upright automatic centrifugal washing machine embodying one form of my invention;

Figure 2 is a vertical sectional view taken substantially along the lines 2—2 of Figure 1 with the parts in normal operating position;

Figure 3 is a sectional view similar to Figure 2 but with the parts shown as tripped under an unbalanced centrifuging condition; and Figure 4 is a view similar to Figs. 2 and 3 but with the lid open and the parts shown in the position taken when the lid is open.

Referring now to the drawings and more particularly to Fig. 1, there is shown for the purpose of illustrating one form of my invention an upright centrifugal washing machine which may, in general, be of the type shown in the Clark Patent 2,577,647, issued December 4, 1951. This machine includes a box-shaped cabinet 20 which forms a support for the hinged lid 22. The lid 22 closes the washing and centrifuging portion of the washing machine. It is usually desired that the machine be stopped whenever the lid is opened. The lid is connected to a hinge arm 24 which forms a part of the lid structure and connects to a pivot pin 26 which forms a connection with the other portion 28 of the hinge structure fastened to the lid supporting portion of the cabinet 20 by the screws 30. The hinge portion 24 is bowed so that when the lid 22 is closed it projects rearwardly and engages an S-shaped push-bar or follower 32 extending through a large aperture 34 in an irregular U-shaped support 36 fastened to a portion of an inner liner 38 of the washing machine structure.

Fastened to this bracket 36 is a plunger-type switch 40 containing mechanically operated electrical switch contacts normally spring propelled to the open position and connected in series with the entire electrical circuit of the washing machine. The movable switch contact is connected to the plunger 42 which is spring-pressed or biased toward the push-bar 32 by a suitable spring within the enclosure of the switch 40. The spring propels the plunger 42 to the limit of its forward movement continuously into engagement with the push-bar 32 which has its other end in engagement with the adjacent portion of the hinge element 24. The push-bar 32 is sufficiently long that the plunger 42 is prevented from moving forwardly far enough to open the switch contacts as long as the lid 22 is closed and the push-bar 32 extends between the hinge portion 24 and the plunger 42, as shown in Fig. 2.

The inner liner member 38 also supports a pivot bracket 44 provided with a pivot pin 46 connecting with ears extending from an irregular bellcrank lever 48. This bellcrank lever is normally urged in a clockwise direction by a coil spring 50 wrapped around the pivot pin and having an arm extending through the aperture 52 in the top of the bellcrank arm while the other end of the spring has an arm extending into contact with the inner liner 38 to hold it from rotation. The bellcrank lever 48 has a downwardly extending arm 54 provided with a cover of elastomeric material 56, such as some suitable form of rubber. This portion 56 is adapted to be engaged by the centrifuging tub 58 of the washer during excessive unbalance during centrifuging. This engagement of the arm 54 causes the pivoting of the irregular bellcrank lever 48 counter-clockwise about the pivot pin 46. The bellcrank lever 48 has another irregular arm 60 extending beneath the push-bar 32 on the opposite side of the bracket 36 from the plunger 42. This arm 60 is raised in the counter-clockwise pivoting, as shown in Fig. 3, so that the rear end of push-bar 32 is lifted so as to become misaligned and disengaged from the plunger 42. This allows the plunger 42 to move toward the hinge portion 24 to its open position thereby mechanically opening the switch contacts of the switch 40. This will stop the machine.

Inclined at an angle of about 45° between the upper portion of the bracket 36 and the adjacent portion of the push-bar 32 is a safety-pin type of spring 64 which, when the lid 22 is opened, pushes the push-bar 32 downwardly and forwardly to the position shown in Fig. 4 so that the adjacent end of the push-bar 32 is again aligned with but positioned in front of and out of contact with the plunger 42. This adjecent end rests against the adjacent part of the bracket 36 under the force of the safety-pin type of spring 64. The spring 50 restores the irregular bellcrank lever 48 to its normal position, as shown in Fig. 4.

It will also be seen that with the bellcrank lever 48 in its normal position, as shown in Fig. 2, the opening of the lid 22 will cause the push-button 32 to assume the same position as shown in Fig. 4 under the impetus of the spring 64 which in this case merely moves the push-bar 32 laterally until it engages the bracket 36. Thus, the switch 40 is opened either by the tub 58 engaging the portion 56 of the bellcrank lever 48 or by the opening of the lid 22, as shown in Fig. 4. The opening of the lid after tripping changes the position of the parts from that shown in Fig. 3 to that shown in Fig. 4. The contents of the tub may then be redistributed to relieve the excessive unbalance. The opening of the lid, therefore, is incidental to the redistribution of the clothes in the tub so that the resetting of the parts is accomplished without the use of any special resetting manipulation. The reclosure of the lid 22 causes the hinge portion 24 to reengage the adjacent end of the push-bar 32 to move the push-bar 32 rearwardly to the position shown in Fig. 2 to restore the parts for normal operation. Thus, this simple, inexpensive mechanical arrangement simplifies the structure and the operation of the device.

By the word "lid" as set forth in the claims I mean any closing device for an opening.

While the form of embodiment of the invention as herein disclosed constitutes a preferred form, it is to be understood that other forms might be adopted, as may come within the scope of the claims which follow.

What is claimed is as follows:

1. In combination, a lid support, a lid structure movably mounted upon said lid support for movement to open and closed positions, an electrically controlled device, a switch means associated with said lid support for controlling said device, a disconnectable follower means extending between said lid structure and said switch means for moving said switch means to closed position upon movement of said lid structure to closed position, and means responsive to a predetermined condition of said device for disconnecting said follower means from said switch means to open said switch means to stop said device, and means responsive to the opening and reclosing of said lid structure for returning said follower means to its position between said lid and said switch means.

2. In combination, a lid support, a lid structure having a hinge connection with said lid support for movement to open and closed position, an electrically controlled device, a switch means for controlling said device located adjacent said structure having a biased switch operating member by which it is moved to open and closed positions, a follower means extending between said lid structure and said switch operating member for moving said member to closed and open position when said lid structure is moved to the closed and open positions, means responsive to a condition of said device for moving said follower means out of connection between said structure and said member to cause said switch means to move to the open position to change the energization of said device.

3. In combination, a lid support, a lid structure having a hinge connection with said lid support for movement to open and closed position, an electrically controlled device, a switch means for controlling said device located adjacent said structure having a biased switch operating member by which it is moved to open and closed positions, a follower means extending between said lid structure and said switch operating member for moving said member to closed and open position when said lid structure is moved to the closed and open positions, means responsive to a condition of said device for moving said follower means out of connection between said structure and said member to cause said switch means to move to the open position to change the energization of said device, and means responsive to an opening and closing movement of said lid structure for restoring said follower means to its normal operating position between said structure and said member.

4. In combination, a lid support, a lid structure having a hinge connection with said lid support for movement to open and closed position, an electrically controlled device, a switch means for controlling said device located adjacent said structure having a biased switch operating member biased toward said lid structure by which it is moved to open position, a column type follower movable with said lid structure and extending between said lid structure and said member to and in the closed position, a trip means responsive to a condition of said device for laterally moving said follower out of operative connection with said member to permit said member to move under its bias to its open position to change the energization of said device.

5. In combination, a lid support, a lid structure having a hinge connection with said lid support for movement to open and closed position, an electrically controlled device, a switch means for controlling said device located adjacent said structure having a biased switch operating member biased toward said lid structure by which it is moved to open position, a column type follower movable with said lid structure and extending between said lid structure and said member of sufficient length to move and hold said operating member to and in the closed position, a trip means responsive to a condition of said device for laterally moving said follower out of operative connection with said member to permit said member to move under its bias to its open position to change the energization of said device, and spring means acting at an angle upon said follower to move said follower back into engagement with said lid structure into position between it and said structure when said lid structure is opened.

References Cited in the file of this patent

UNITED STATES PATENTS 2,206,102    Meuer ------------------ July 2, 1940